C. G. SMITH.
SPRING WHEEL.
APPLICATION FILED FEB. 11, 1913.
1,215,730.
Patented Feb. 13, 1917.
2 SHEETS—SHEET 1.
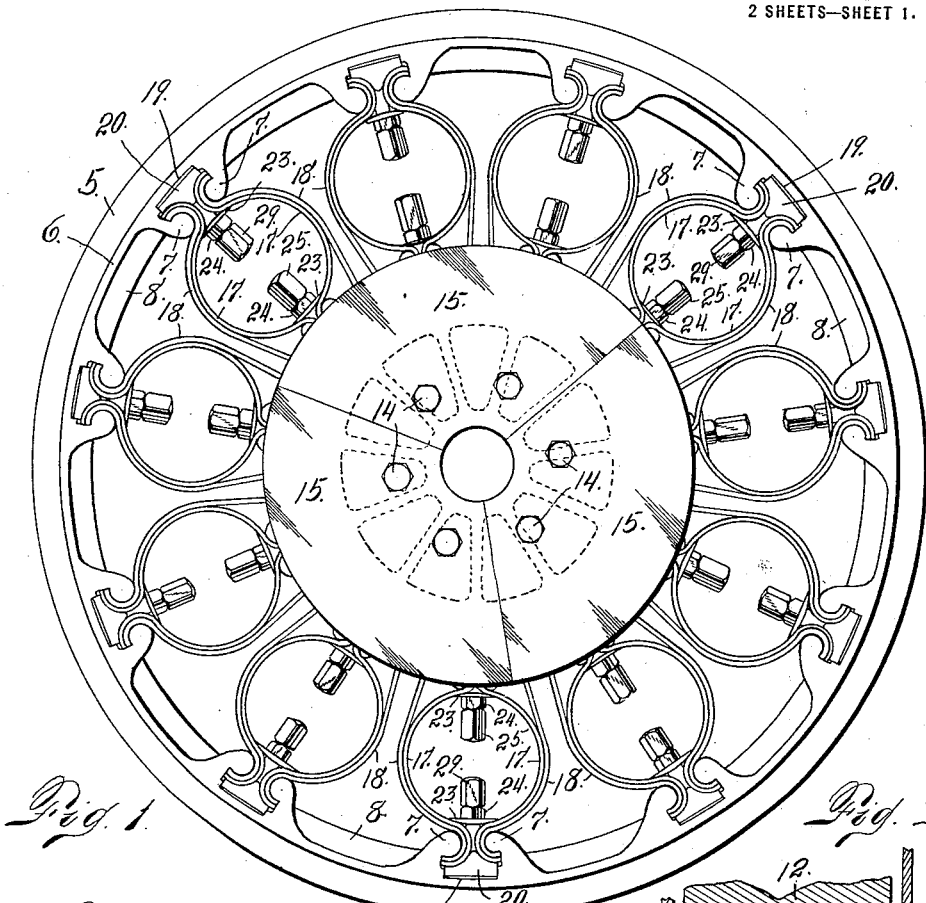
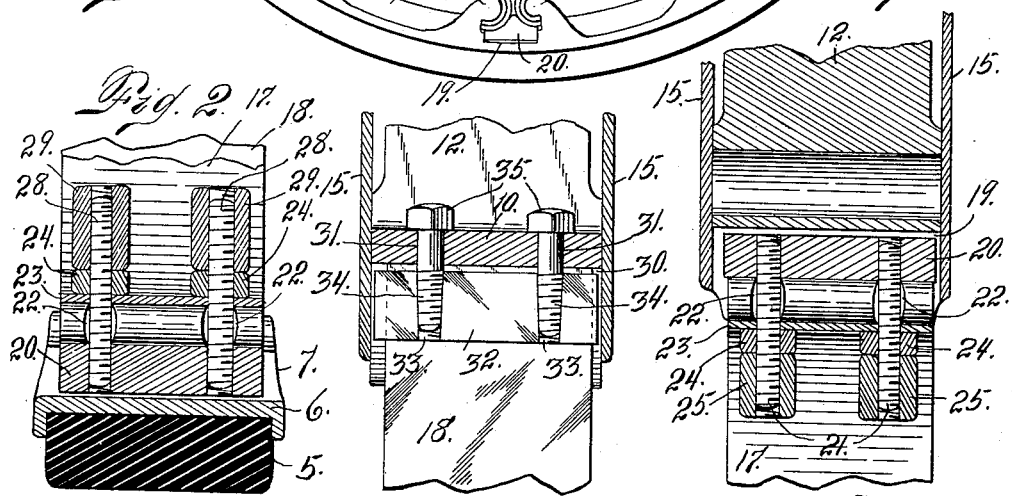
Witnesses
Otto E. Haddick
Solon J. Boughton
Inventor
Cicero G. Smith
By A. J. O'Brien
Attorney C. G. SMITH.
SPRING WHEEL.
APPLICATION FILED FEB. 11, 1913.
1,215,730.
Patented Feb. 13, 1917.
2 SHEETS—SHEET 2.
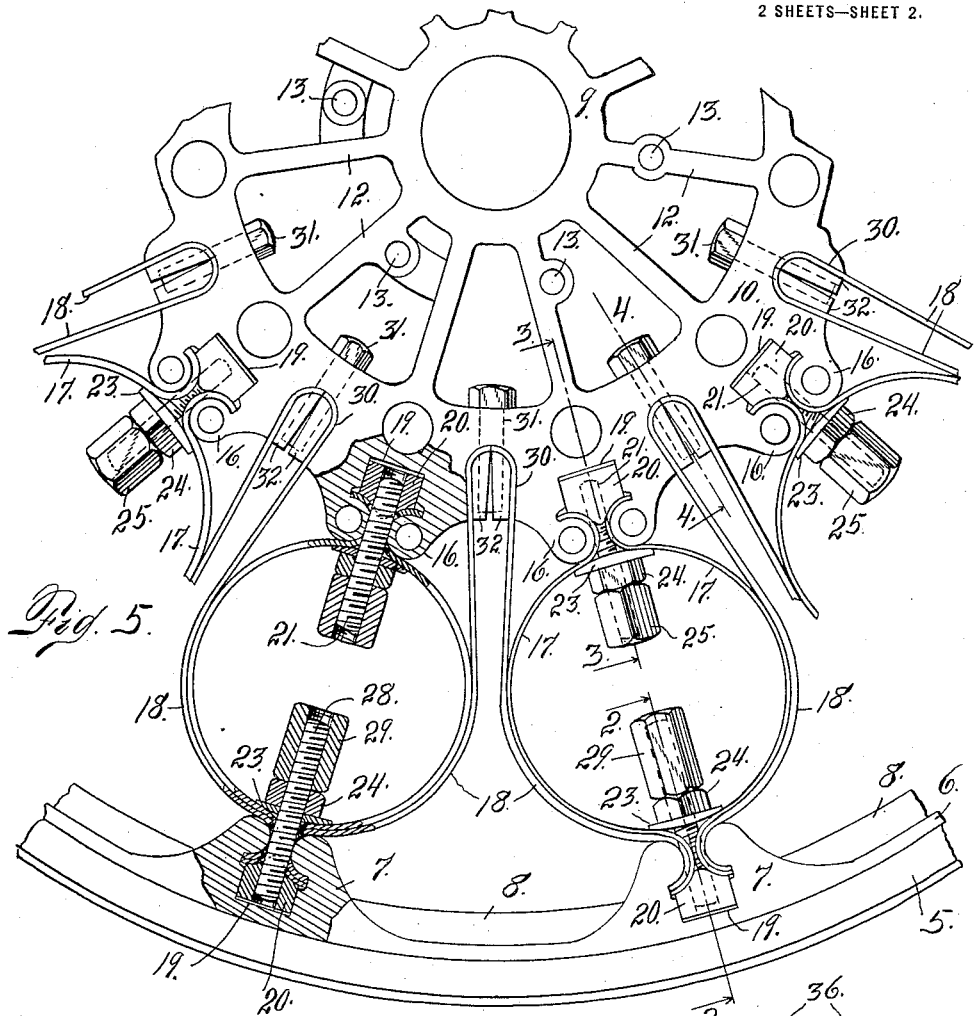
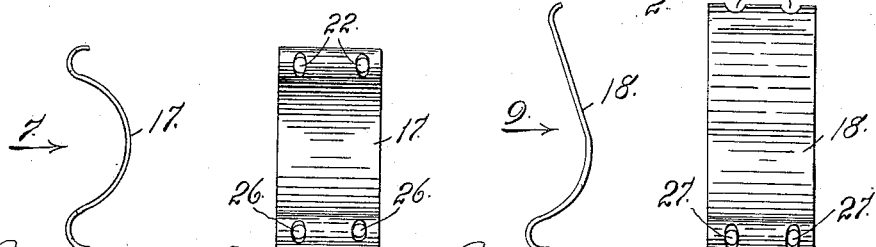
Witnesses
Otto E. Hoddick.
Solon J. Boughton
Inventor
Cicero G. Smith.
By A. J. O'Brien
Attorney

UNITED STATES PATENT OFFICE.

CICERO G. SMITH, OF PALISADES, COLORADO, ASSIGNOR TO THE SMITH SPRING WHEEL COMPANY, OF ALBUQUERQUE, NEW MEXICO, A CORPORATION OF ARIZONA.

SPRING-WHEEL.

1,215,730.

Specification of Letters Patent.

Patented Feb. 13, 1917.

Application filed February 11, 1913. Serial No. 747,602.

*To all whom it may concern:*

Be it known that I, CICERO G. SMITH, a citizen of the United States, residing at the city of Palisades, county of Mesa, and State of Colorado, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in spring wheels for vehicles, and may be considered an improvement over my Patent No. 1,047,319, issued December 17, 1912, or more particularly over my co-pending application, Serial No. 697,908, filed May 17, 1912.

One of the objects is the provision of means for readily clamping in place the extremities of the springs and for making the clamping bolt especially accessible for purposes of installation and adjustment.

Another object of the invention is to provide stops in connection with the fastening means for certain of the springs, said stops being adapted to prevent the flexure of the springs beyond their limits of elasticity.

Other objects will appear hereinafter as I proceed with the description of that embodiment of the invention which, for the purposes of the present application is illustrated in the accompanying drawings, in which:

Figure 1 is a side elevation of my improved wheel.

Fig. 2 is a cross sectional detail taken upon line 2—2, Fig. 5.

Fig. 3 is a cross section taken upon line 3—3, Fig. 5.

Fig. 4 is a cross section taken upon line 4—4, Fig. 5.

Fig. 5 is a fragmental detail view, partly in section of a portion of the wheel with the hub plates removed.

Fig. 6 is an edge view of one of the circle springs.

Fig. 7 is a face view of the same looking in the direction of arrow 7, Fig. 6.

Fig. 8 is an edge view of one of the spoke springs.

Fig. 9 is a face view of the same looking in the direction of arrow 9, Fig. 8.

The same reference numerals refer to like parts throughout the views.

In the drawings, which form a part of this specification, the numeral 5 designates a rubber tire of the cushion variety which is mounted upon a rim 6 provided at intervals with transverse bosses 7 and with longitudinal ribs 8 between each pair of bosses.

The hub of the wheel is in the form of a spider having an inner circular member 9, an outer circular member 10 and radial arms 12 joining the two circular members. Bolt holes 13 are located in the hub, being formed in enlargements of the arms 12 or in webs bridged across adjacent arms. The holes 13 are adapted to receive bolts 14 for securing in place side plates 15 upon the side of the wheel, these plates concealing from view the hub spider and the spring fastening elements located therein. It will be noted that these side coverings are each formed of three separate plates 15 and that the fastening for any of the springs may be made accessible by removing only one of said plates.

Between the bosses 7 upon the rim, and similar bosses 16 upon the hub, I mount circular springs 17 of flat material while springs 18 of the same material are also mounted in the bosses 7 at the outer extremity of the springs and in the hub at the inner extremities.

In each boss 16 is formed an opening 19 constricted at its mouth to form a comparatively narrow passage. Within the large inner part of the opening 19, I place a double nut 20, the outer face of which is wedge shape as clearly illustrated in Fig. 5. After the hooked inner extremities of the circle springs 17 have been slid into place within the opening 19, headless bolts 21 are inserted into the threaded perforations of the nut 20, the springs being cut away at 22 in order to permit the free passage of the bolts. Although in the construction illustrated in the drawing, I have used two bolts 21 and other parts accordingly, it should be understood that I do not limit myself to the use of two bolts, since the number employed may be varied according to the nature of the work for which the wheel is intended.

A washer plate 23 is slid into place upon the bolts and is pressed against the inner sides of the springs 17 by nuts 24, the tightening of the nuts 24 drawing the wedge nut 20 outwardly thereby spreading and clamping the extremities of the springs. After the nuts 24 have been placed, internally threaded sleeves 25 are secured upon bolts 21, the sleeves being shaped externally like nuts and being long enough to completely cover the sides of the bolts when screwed down tightly against the nuts 24.

The fastenings for the outer extremities of the circle springs 17 and spoke springs 18 are precisely the same as the fastenings just described, except for the fact that the opening in the boss 7 is larger in order to accommodate both sets of springs. The outer bolt 28 is also somewhat longer than the bolt 21 and the sleeve 29 is correspondingly longer than the sleeve 25. Otherwise, I have used the same reference numerals in the drawings to refer to the parts of the outer fastenings.

In the outer extremities of the circle springs 17 are cut out portions 26 and in the outer extremities of the spoke springs 18 are similar cut out portions 27 for the reception of the bolts 28.

Midway between the bosses 16 upon the hub, are formed recesses 30 from the rear of which extend smooth openings 31 through the circular portion 10 of the hub. After the inner extremities of the spoke springs 18 have been inserted into the opening 30, clamping blocks 32 are also inserted into the same opening, these blocks being provided on their adjacent sides with threaded bolt sockets 33 tapering gradually toward the mouth of the opening 30 adapted to receive bolts 34, the threaded portions of which are formed with the same taper. As the heads 35 of the bolts are rotated, the latter spread apart, the blocks 32 thereby clamping the springs 18 against the walls of the opening 30. Recesses 36 are cut into the inner end of each spring 18 for the reception of the bolts 34.

In assembling my improved wheel all of the spring members, the nuts 20 and the blocks 32 are slid into place from one side before the plates 15 are put in position. The entire wheel may be put together without the use of machinery or of any tool other than a wrench.

Attention is called to the fact that the sleeves 25 and 29 serve a double purpose: first, they act as lock nuts and second, they act as stops to prevent a sudden shock or an excessive load from breaking the springs or bending them beyond a point from which they cannot completely recover.

I claim as my invention:

1. In a spring wheel, means for clamping flat springs consisting of an element having an opening therein, said springs adapted to be inserted in said opening, clamping blocks also arranged in said opening, the adjacent faces of said blocks being each cut away to form a common threaded bore tapering toward the mouth of said opening and a correspondingly tapered bolt threaded into said bore from the rear of the opening.

2. In a spring wheel, means for clamping flat springs consisting of an element having an opening therein, adapted to receive the ends of the springs along oppositely disposed walls, clamping blocks arranged in said opening adjacent the springs, the adjacent faces of said blocks being each cut away to form a common bore tapering toward the mouth of the opening and a correspondingly tapered bolt extending into said bore from the inner extremity of the opening.

3. In a wheel, a hub, a rim, spring members located between and connecting the hub and rim, the said members being approximately semi-circular in shape and arranged in pairs to form approximately circular elements, the extremities of the two members of each element being bent outwardly to form eyes, the rim and hub being respectively provided with members of counterpart shape which the said eyes respectively engage, radially alined bolts located between the eyes of each pair of spring members of each spring element, and extending both interiorly and exteriorly of the said eyes, and abutments applied to the adjacent extremities of the said bolts for the purpose set forth.

In testimony whereof I affix my signature in presence of two witnesses.

CICERO G. SMITH.

Witnesses:
 OLIVE L. DAVIS,
 ARTHUR A. JONES.